(12) United States Patent
Bierl et al.

(10) Patent No.: US 11,110,523 B2
(45) Date of Patent: Sep. 7, 2021

(54) MACHINING TOOL

(71) Applicant: KOMET GROUP GMBH, Besigheim (DE)

(72) Inventors: Wolfgang Bierl, Güglingen (DE); Rico Schneider, Pleidelsheim (DE); Frank Schmid, Deizisau (DE); Karl-Heinz Edelmann, Ehningen (DE)

(73) Assignee: Komet Group GmbH, Besigheim (DE)

( * ) Notice: Subject to any disclaimer, the term of this patent is extended or adjusted under 35 U.S.C. 154(b) by 128 days.

(21) Appl. No.: 16/393,362

(22) Filed: Apr. 24, 2019

(65) Prior Publication Data

US 2019/0247935 A1    Aug. 15, 2019

Related U.S. Application Data

(63) Continuation of application No. PCT/EP2017/068551, filed on Jul. 21, 2017.

(30) Foreign Application Priority Data

Oct. 27, 2016   (DE) .................... 10 2016 120 595.8

(51) Int. Cl.
*B23B 51/04* (2006.01)
*B23B 51/10* (2006.01)
*B23D 77/00* (2006.01)

(52) U.S. Cl.
CPC .......... *B23B 51/0486* (2013.01); *B23B 51/10* (2013.01); *B23B 2270/30* (2013.01); *B23D 77/006* (2013.01); *B23D 2277/30* (2013.01)

(58) Field of Classification Search
CPC ... B23B 51/0486; B23B 2270/30; B23C 5/28; B23C 2230/04; B23C 2230/045; B23C 2230/08
See application file for complete search history.

(56) References Cited

U.S. PATENT DOCUMENTS

| | | | | |
|---|---|---|---|---|
| 4,313,506 A | * | 2/1982 | O'Connell | E21B 10/58 175/418 |
| 4,515,230 A | * | 5/1985 | Means | E21B 10/58 175/418 |
| 6,123,489 A | | 9/2000 | Reccius et al. | |
| 6,595,305 B1 | * | 7/2003 | Dunn | B23B 51/00 175/336 |

(Continued)

FOREIGN PATENT DOCUMENTS

| DE | 40 33 877 A1 | 4/1992 |
|---|---|---|
| DE | 196 12 104 A1 | 10/1997 |

(Continued)

OTHER PUBLICATIONS

International Search Report, PCT/EP2017/068551, dated Oct. 6, 2017, 3 pages.
International Preliminary Report on Patentability, PCT/EP2017/068551, dated Dec. 18, 2018, 5 pages.

*Primary Examiner* — Eric A. Gates
(74) *Attorney, Agent, or Firm* — Bose McKinney & Evans LLP (57) ABSTRACT

A machining tool for use in machine tools for rotating cutting operations has a main body, which can be rotated about a center axis and which is elongate in the direction of the center axis, at least one cutting element fastened to the main body and at least one chip removal channel, which extends along the main body outside of the center axis and which is bounded inwardly by a core of the main body, through which core the center axis passes. The chip removal channel is outwardly closed at least over a longitudinal section by an outer chip space wall adjoining the core.

20 Claims, 4 Drawing Sheets

(56) References Cited

U.S. PATENT DOCUMENTS

| | | | | |
|---|---|---|---|---|
| 6,948,890 | B2* | 9/2005 | Svensson | B23B 51/0486 |
| | | | | 408/56 |
| 7,572,088 | B2* | 8/2009 | Biscay | B23Q 11/006 |
| | | | | 408/225 |
| 8,388,279 | B2* | 3/2013 | Kitsukawa | B23B 51/06 |
| | | | | 408/67 |
| 8,622,661 | B2* | 1/2014 | Inamasu | B23C 5/10 |
| | | | | 407/11 |
| 9,364,927 | B2* | 6/2016 | Bohn | B23P 15/28 |
| 9,555,480 | B2* | 1/2017 | DeLand | B23B 51/06 |
| 2009/0003948 | A1* | 1/2009 | Lutz | B23B 29/03 |
| | | | | 408/199 |
| 2010/0260558 | A1 | 10/2010 | Kress | |
| 2012/0285749 | A1 | 11/2012 | Bohn et al. | |

FOREIGN PATENT DOCUMENTS

| | | | | |
|---|---|---|---|---|
| DE | 20 2007 016 817 U1 | 2/2008 | | |
| DE | 10 2010 021 212 A1 | 11/2011 | | |
| DE | 10 2011 075 769 A1 | 11/2012 | | |
| DE | 102011114412 A1 * | 3/2013 | | B23B 51/0493 |
| DE | 10 2013 108 825 B3 | 10/2014 | | |
| DE | 10 2016 111 671 B3 | 8/2017 | | |
| DE | 102018201195 B3 * | 5/2019 | | B23C 5/165 |
| EP | 1 475 174 A1 | 11/2004 | | |
| EP | 2 140 960 A2 | 1/2010 | | |
| EP | 2 522 447 A1 | 11/2012 | | |
| JP | 2013103288 A * | 5/2013 | | |
| WO | WO 2009/071288 A1 | 6/2009 | | |
| WO | WO-2009107235 A1 * | 9/2009 | | B23B 51/06 |
| WO | WO-2019087656 A1 * | 5/2019 | | B23D 77/006 |

\* cited by examiner

MACHINING TOOL

RELATED APPLICATIONS

This application is a continuation of PCT/EP2017/068551, filed Jul. 21, 2017, which claims priority to DE 10 2016 120 595.8, filed Oct. 27, 2016, the disclosures of both of which are hereby incorporated herein by reference in their entirety.

BACKGROUND

This disclosure relates to a machining tool for use in machine tools for rotating cutting operations, in particular a solid drilling tool, re-boring tool, counterboring tool or reaming tool, comprising a main body, which can be rotated about a center axis and is elongate in the direction of the center axis, at least one cutting element fastened to the main body, and at least one chip removal channel, which extends along the main body outside of the center axis and is delimited inwardly by a core of the main body, through which core the center axis passes.

In conventional machining tools, e.g., solid drilling tools, re-boring tools, counterboring tools or reaming tools, the chip flutes are radially outwardly open. Owing to centrifugal force, the chips are flung against the hole wall and may damage this wall and/or remain in recesses in the component. Furthermore, the stability of the main body is reduced by the open chip spaces. In principle, closed chip spaces, which are additionally twisted, cannot be produced by milling. If necessary, very short tools may be realized, but the contour thereof depends on available machining tools. Longer tools could be produced by drilling; however, twisting of the chip spaces cannot be achieved here.

SUMMARY

This disclosure teaches an improved machining tool that addresses the above-mentioned disadvantages and allows increased stability and variable cross-sectional geometry. This disclosure teaches targeted removal of chips and in general achieves a high level of manufacturing quality. This disclosure also teaches how to prevent chips from falling back into the hole.

This disclosure is based on the premise that at least one axial portion of the chip removal channel is annularly delimited. It is therefore proposed according to this disclosure for the chip removal channel to be annularly radially outwardly closed, at least over a longitudinal portion, by an outer chip space wall of the main body which adjoins the core and is formed in one piece therewith. The rigidity of the main body is increased by the chip removal channel having a closed cross section. At the same time, chips are prevented from randomly exiting the chip removal channel and impairing the manufacturing quality.

Advantageously, the outer chip space wall forms part of the outer surface of the main body which surrounds the center axis so as to be closed, such that an overall homogeneous tool body is achieved.

In a particularly preferred embodiment, the outer chip space wall is formed by a powder material by means of an additive manufacturing process, in particular by selective laser melting. Owing to the additive manufacturing process, there are freedoms in the design of the chip space, which are not achievable using ablative manufacturing processes. The size and shape of the chip space can be variably adapted in order to achieve an optimized chip geometry and chip removal. In particular, various pitches of the chip spaces and changeable pitches within the chip space are simple to achieve. These options include changes to the cross section across the length of the tool, although relatively long tools can also be made.

It is also advantageous in this connection if the outer chip space wall and at least one part of the core are integrally formed as one component in an additive process. A uniform cutting portion of the main body can thus be made as a 3D-printed part.

For additional functional adaptation, it is advantageous if the wall thickness of the outer chip space wall varies when viewed in the circumferential direction.

For optimized chip removal, it is possible for the chip removal channel to extend along the main body, optionally with a variable pitch, in a coiled or twisted manner.

In a further improvement, the course of the chip removal channel has a variable cross-sectional size that preferably expands towards the rear.

In order to support the removal of chips and to prevent blockages, it is conceivable for the chip removal channel to have a cross-sectional shape that is not circular.

With reference to differently arranged cutting elements, it may also be advantageous if a plurality of chip removal channels are arranged in the main body so as to have different courses, in particular so as to have different pitches.

So as not to hinder the inflow of chips, it is advantageous if the cutting element is arranged in the region of an outwardly open chip conducting contour of an associated chip removal channel.

It is also favorable if the chip removal channel comprises a chip outlet that is kept clear of the outer chip space wall.

In a particularly advantageous embodiment, at least one coolant channel passes through the core.

In order to adapt the conduction of coolant to the tool geometry and in particular to the course of the chip spaces, it is advantageous if the coolant channel extends so as to be spatially curved, at least in portions.

To optimize the use of cooling lubricant and to prevent structural weaknesses, for example in the region of clamping screws, it is favorable for the coolant channel to be branched in an end portion to form a plurality of outlet holes.

In principle, it is possible for the cutting element to be directly connected to the main body by means of soldering, gluing, clamping, screwing or sintering, or to be indirectly held on the main body by means of a cartridge.

A particular aspect of this disclosure is that the main body comprises a front end-wall, which preferably lies in a radial plane and is oriented forwards in the feed direction, and that the end wall covers a cross-sectional region of the at least one chip removal channel. As a result, residual chips no longer remain in the workpiece, since the end-face cover prevents chips from falling back out of the chip removal channel in an undesired manner when the tool is being withdrawn. Expediently, a cross-sectional region of more than 50% of the chip removal channel should be covered. In general, there is also the advantage that the closed chip channel shape protects the hole wall from chips, and therefore the surface roughness is reduced.

A further, related improvement is that the end wall delimits an end gap, which opens into the chip removal channel, with respect to the cutting element, and so the produced chip has to flow by its root through the gap in the chip removal channel but can no longer exit therefrom as a whole piece.

The clearance of the end gap is determined by the feed rate and the chip thickness produced and should advantageously be in the range of 0.2 to 1.0 mm.

In order to prevent a collision between the end cover and/or the end wall and the base of the workpiece, but to ensure a reliable chip inflow, the cutting element should have an end cutting-edge that projects forwards beyond the end wall, with the projection of the end cutting-edge advantageously being in the range of 0.1 to 0.8 mm.

For guidance on the hole wall or machining thereof, it is advantageous if the cutting element comprises a radially outwardly pointing radial cutter or cylindrical grinding bevel, and for a radial gap to be kept clear between the outer chip space wall and the cutting element. The end gap and the radial gap should together form an angled gap-opening.

Advantageously, the outer chip space wall has a radially outwardly protruding wall projection that is arranged upstream of the cutting element in the direction of rotation of the tool. The chip produced thus enters the interior of the chip removal channel and is not guided further outwards along the edge.

To improve the chip removal and the conveying capacity, it is advantageous if the at least one coolant channel extends, in an arcuate manner, to an outlet opening that opens into the chip removal channel and is oriented in the chip removal direction, i.e. is oriented towards the rear.

In order to optimize the shaping of the chip and to optimize the conveying of the chip, the at least one chip removal channel is in the form of a spiral. It is therefore also advantageous if the associated coolant channel extends around the center axis so as to be in the form of a spiral.

An improvement to the machining process can also be achieved by inclining the cutting element by a shaft angle so as to be oblique with respect to the center axis.

In order to prevent seizing on the hole wall, it is advantageous if the outer surface of the main body expands in diameter only in the front end-portion and is thus tapered towards the rear.

So that a complete drilling process is possible, it is favorable if at least one cutting element comprises one end cutting-edge that extends radially inwardly as far as the center axis.

A further design option for more complex holes is for the main body to have an axial stepped contour having various diameters and for at least one cutting element to be arranged in the region of the stepped contour.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

It shall be understood that terms such as "horizontal" and "vertical" are generally used herein to establish positions of individual components relative to one another rather than an absolute position in space. Further, regardless of the reference frame, in this disclosure terms such as "vertical," "parallel," "horizontal," "right angle," "rectangular" and the like are not used to connote exact mathematical orientations or geometries, unless explicitly stated, but are instead used as terms of approximation. With this understanding, the term "vertical," for example, certainly includes a structure that is positioned exactly 90 degrees from horizontal, but should generally be understood as meaning positioned up and down rather than side to side. Other terms used herein to connote orientation, position or shape should be similarly interpreted. Further, it should be understood that various structural terms used throughout this disclosure and claims should not receive a singular interpretation unless it is made explicit herein. By way of non-limiting example, the terms "cutting element," "chip removal channel," and "coolant channel," to name just a few, should be interpreted when appearing in this disclosure and claims to mean "one or more" or "at least one." All other terms used herein should be similarly interpreted unless it is made explicit that a singular interpretation is intended.

The drilling tool 10 shown in the drawings comprises a main body 14, which can be rotated about a center axis 12 and is elongate in the direction of the center axis, two cutting elements 16, 18, which are fastened to the front end-face of the main body 14 so as to be at an angular spacing of 180° and radially offset from one another, downstream of which cutting elements a chip removal channel 24, which is radially outwardly closed by an outer chip space wall 22, is arranged in each case.

Figure 1:
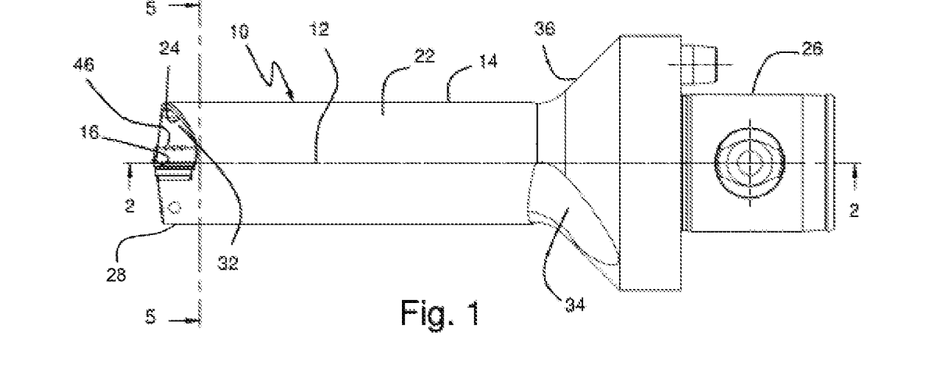
FIG. 1 is a side view of a drilling machine tool for solid drilling, having radially closed chip removal channels.
Figure 2:
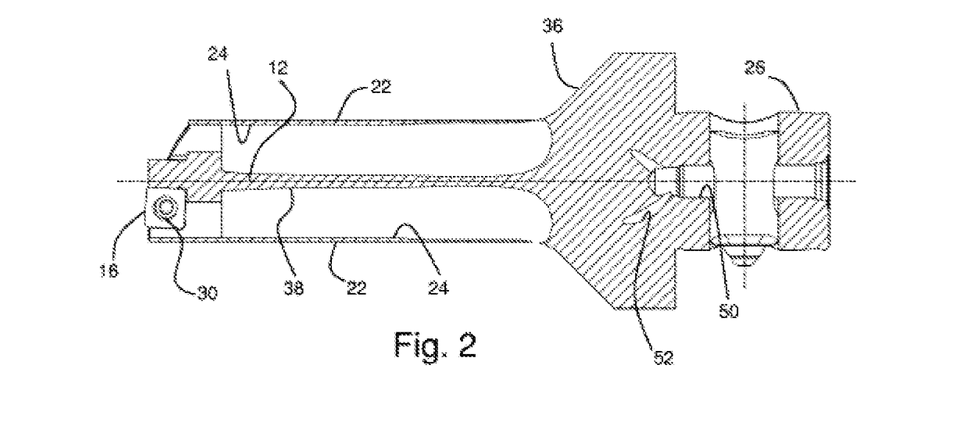
FIG. 2 is a section along the line 2-2 in FIG. 1.
Figure 3:
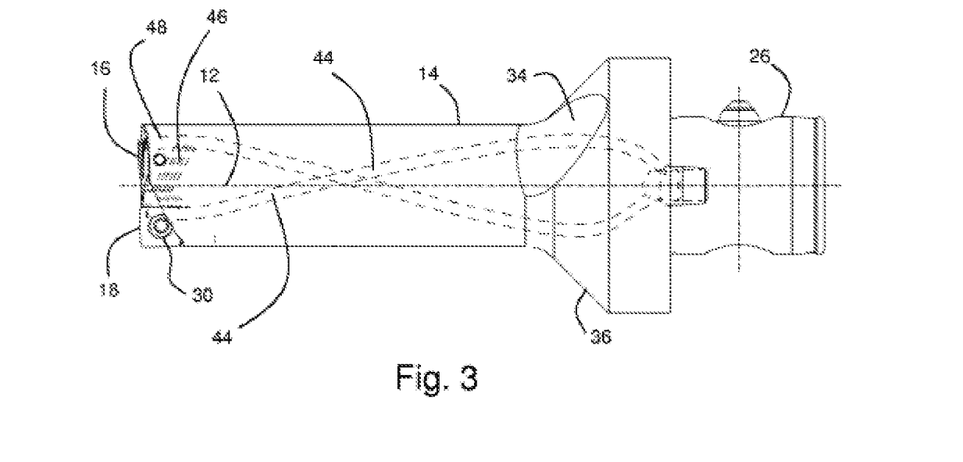
FIG. 3 is a side view of the drilling machine tool according to FIG. 1, rotated by 90°.

As can be seen in FIGS. 1 to 3, the main body 14 has on its rear portion a clamping part 26, for example an ABS interface, suitable for clamping in the spindle of a machine tool. Therefore, the drilling tool 10 can be driven in rotation about its center axis 12 and can move in the direction of the center axis 12 in the feed process.

The main body 14, at least in its outer cylindrical front shaft part 28, is additively or generatively produced as a molded steel part, including the outer chip space wall 22, for example by selective laser melting. In this 3D shaping process, a thin layer of a powder material is applied to a building platform. After that, the powder material is locally re-melted using a laser so that a solid material layer forms after solidification. When the material is solidified, the building platform is lowered according to the layer thickness and a new powder layer is applied. In this way, tools or molds do not need to be used, it being possible for the molded blank to be produced with a large amount of geometrical freedom. The selective laser melting (SLM) is therefore an additive process by comparison with a conventional subtractive machining manufacturing process.

The cutting elements 16, 18 each have an end cutting-edge which extends substantially perpendicularly to the center axis 12. In the embodiment shown, the cutting elements 16, 18 are fastened in the form of indexable cutter inserts in respective insert seats by means of a fastening screw 30. However, said cutting elements can also be soldered onto the main body 14 as PCD cutting edges.

Figure 4:
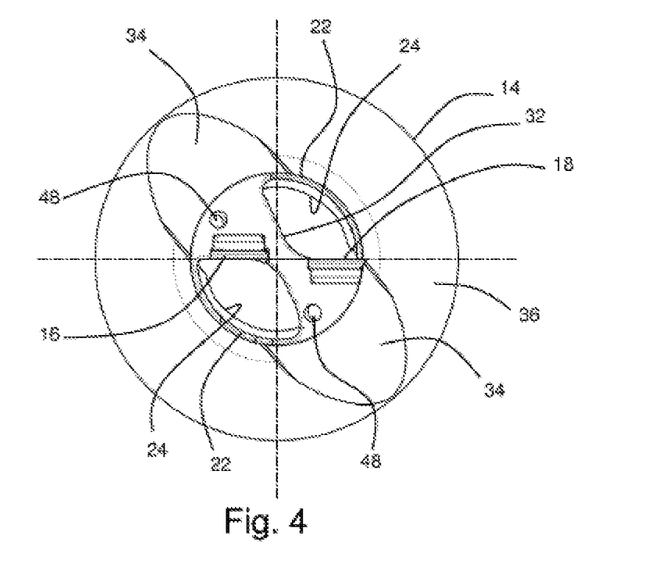
FIG. 4 is a front end-view of the drilling machine tool.

As can be seen in FIG. 4, a chip conducting contour 32, which is open at the end face, adjoins the cutting elements 16, 18 and discharges the removed chips into the respective chip removal channel 24. At the rear ends thereof, the chip removal channels comprise a chip outlet 34 which is kept clear of the outer chip space wall 22. Said chip outlet is in a conical portion 36 of the main body 14 that expands towards the rear.

Figure 5:
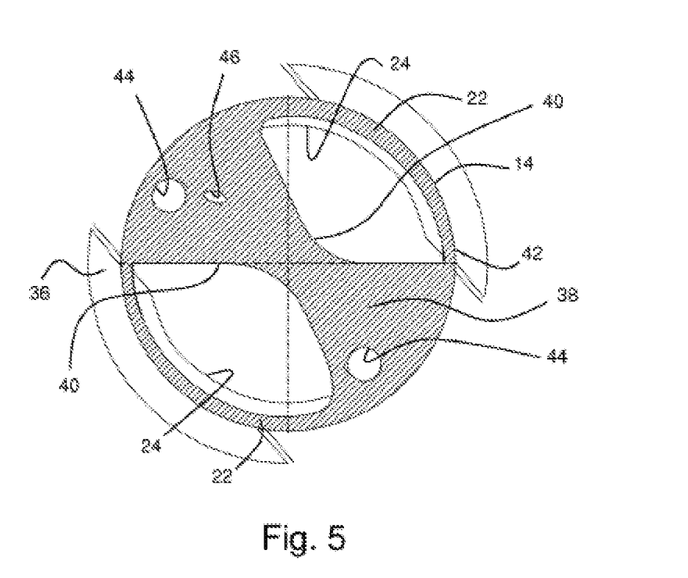
FIG. 5 is a radial section along the line 5-5 in FIG. 1.

As can be seen best in FIG. 5, the main body 14 has a partition-like core 38, through which the center axis 12 passes and which expands radially outwardly towards the chip space walls 22. The core 38 thus inwardly delimits, by means of its two side walls 40, the chip removal channels 24, while the integrally formed outer chip space walls 22 radially outwardly close the chip removal channels 24. In the process, an approximately elliptical cross-sectional area, which differs from the circular shape, is kept clear for the removal of chips.

As can also be seen from FIG. 5, the outer chip space walls 22 have a variable wall thickness with a partially cylindrical outer contour that adjoins the outer face of the core 38 so as to be flush, and so the main body 14 is enclosed by an outer surface 42 that surrounds the center axis 12 so as to be closed. The chip removal channels 24 are thus completely annularly closed. As a result, the produced chips cannot reach the free spaces of the workpiece or in the hole walls of the components and said chips are guided in their entirety to the open chip outlet 34 and, therein, are transported outwards at a distance from the workpiece.

In the embodiment shown, the chip removal channels 24 extend outside of the center axis 12 in a straight line through the main body 14. In order to ensure an optimized chip flow, it is also possible, owing to the additive construction, for the size and/or shape of the chip removal channels 24 to be variably adapted to an optimized chip geometry and chip removal, for example to have a cross-sectional size that increases towards the rear, counter to the feed direction, and optionally to be coiled with variable pitch. Pitches of the chip spaces that differ from one another and variable pitches within the respective chip space are also conceivable.

FIGS. 3 and 5 show two coolant channels 44 which pass through a wall section of the core 38 and follow a spatially curved course, so as to be adapted to the optimized rigidity of the tool. The coolant channels 44 branch to form a plurality of outlet holes 46, 48. As can be seen from FIG. 2, the coolant or the cooling lubricant is fed in from the rear side of the tool 10 via a central supply channel 50 in the main body 12. From there, curved branches 52 extend towards the respective coolant channel 44. Such geometrically complex shaping of the coolant conducting means is practically possible only by means of the additive manufacturing process.

In the drilling tool 10 shown in FIGS. 6 to 10, identical or similar parts are provided with the same reference signs as described above. A shank tool is shown here, which has a rear cylindrical shaft as the clamping part 26 and a front cutting portion as the main body 14, which is constructed additively in the form of an integral 3D-printed part.

A characteristic feature is that the main body 14 has a front end-wall 54, which is oriented in a feed direction and covers a large extent of the two chip removal channels 24 at the end faces and thus prevents the chips from falling back into the hole produced. In order to allow the flow of chips into the chip removal channels, a relevant end gap 56 in the end wall 54 is kept clear of the cutting elements 16, 18. As can be seen best from FIG. 8, a radial gap 58 in the outer chip space wall 22 adjoins the end gap 56. While the end cutting edge 60 of the cutting elements 16, 18 projects beyond the end wall 54 by less than 1 mm, a cylindrical grinding bevel 62 is provided on the radial cutting element edge and allows guidance on the hole wall.

The radial gap 58 is expediently delimited by a wall projection 64, which projects radially from the chip space wall 22 and prevents chip remnants from being able to travel past. It is also favorable for the front end-portion 66 to have a diameter that expands with respect to a portion 68 which adjoins at the rear (cf. FIGS. 6 and 7). For a stepped drilling process, it is also conceivable for the main body to expand incrementally towards the rear, and that at least one additional cutting element (not shown) is arranged in the region of the stepped contour.

Figures 6, 7:
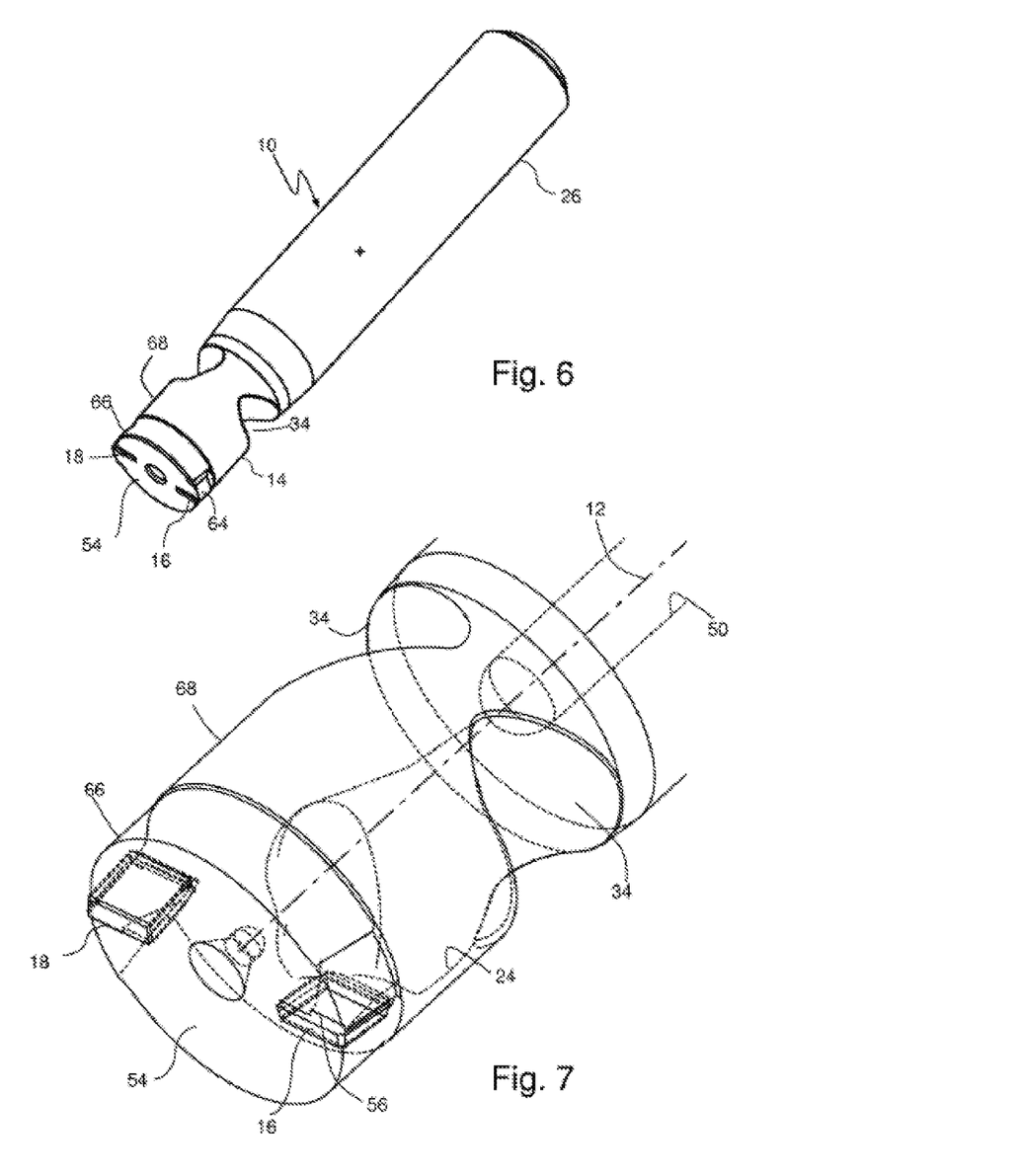
FIG. 6 is a perspective view of a drilling tool having radially closed chip removal channels that are covered at the end face.
FIG. 7 is an enlarged view of the cutting position of the drilling tool according to FIG. 6.
Figure 8:
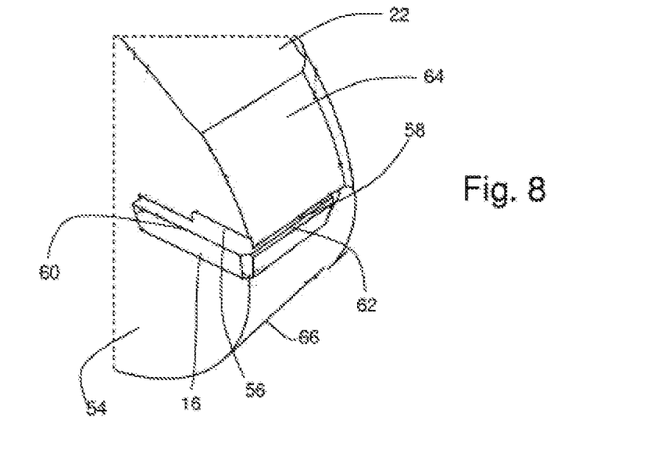
FIG. 8 is an enlarged detail in the region of a cutting element of FIG. 7.
Figure 9:
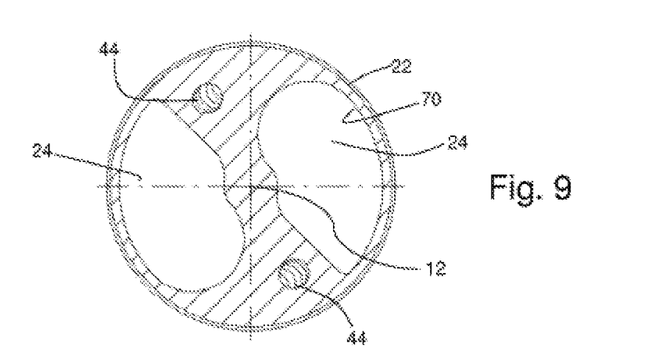
FIG. 9 is a cross section of the drilling tool according to FIG. 6 in the region of the chip removal channels.

According to FIG. 7, it can also be seen from the positioning of the cutting elements 16, 18 and the chip outlet openings 34 that the chip removal channels 24, of which only one is indicated by a dashed line, extend so as to be coiled. The inner wall 70 is shaped so as to be circumferentially complex, which can also be seen from FIG. 9.

Figure 10:
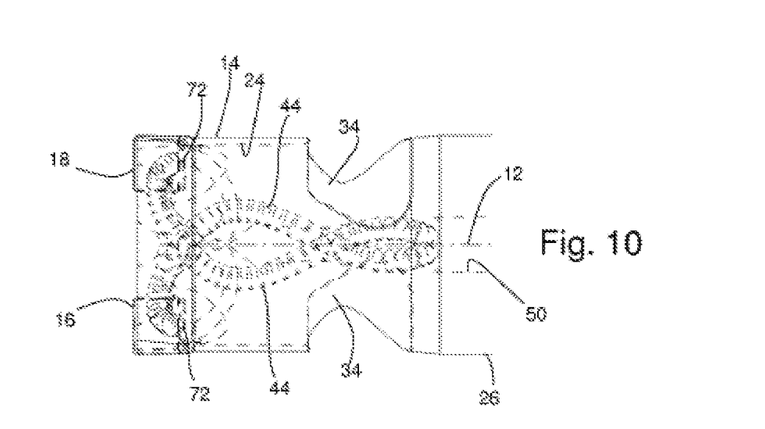
FIG. 10 is a side view of the cutting portion of the drilling tool according to FIG. 6, with the coolant channels indicated.

As illustrated in FIG. 10, the coolant channels 44, which branch off the central feed channel 50, extend so as to be in the form of a spiral around the center axis 12 and so as to be arcuate in relation to an individual outlet opening 72 in each case. Said opening opens, oriented towards the rear, into the respective chip removal channel 24, as a result of which the chip flow is promoted by the flow of coolant. FIG. 7 also indicates that the cutting elements 16, 18 are obliquely inclined by a shaft angle, for example of 10°, with respect to the center axis in order to improve the cutting action.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A machining tool for use in machine tools for rotating cutting operations, comprising:
   a main body extending in the direction of a center axis and rotatable about the center axis;
   a cutting element fastened to the main body;
   a chip removal channel extending along the main body outside of the center axis and bounded inwardly by a core of the main body through which the center axis passes;
   an outer chip space wall adjoining the core and closing a longitudinal section of the chip removal channel, wherein the outer chip space wall and at least part of the core are formed as an integral additive manufacturing component whereby the outer chip space wall and the at least part of the core are a single homogenous piece of material;
   a coolant channel passing through the core and having curved sections; and wherein the main body has a front end-wall that covers a cross-sectional region of the chip removal channel and the end wall delimits an end gap that opens into the chip removal channel.

2. Machining tool according to claim 1, wherein the outer chip space wall forms part of an outer surface of the main body which surrounds the center axis.

3. Machining tool according to claim 1, wherein the outer chip space wall has a varying wall thickness as viewed in the circumferential direction.

4. Machining tool according to claim 1, wherein the chip removal channel extends along the main body and is coiled or twisted.

5. Machining tool according to claim 1, wherein the course of the chip removal channel has a variable cross-sectional size that expands towards the rear.

6. Machining tool according to claim 1, wherein the chip removal channel has a cross-sectional shape other than circular.

7. Machining tool according to claim 1, wherein the coolant channel is branched in an end portion to form a plurality of outlet holes.

8. Machining tool according to claim 1, wherein the cutting element is directly connected to the main body by soldering, gluing, clamping, screwing or sintering or is indirectly held on the main body by a cartridge.

9. Machining tool according to claim 1, wherein the end gap has a clearance in the range of 0.2 to 1.0 mm.

10. Machining tool according to claim 1, wherein the coolant channel extends around the center axis in the form of a spiral.

11. Machining tool according to claim 1, wherein the main body has an axial stepped contour having various diameters and the cutting element is arranged in the region of the stepped contour.

12. A method for producing a machining tool according to claim 1, comprising:
providing a main body extending in a direction of a center axis, a cutting element fastened to the main body, a chip removal channel extending along the main body outside of the center axis and bounded inwardly by a core of the main body through which the center axis passes, and an outer chip space wall adjoining the core and closing the chip removal channel;
forming the outer chip space wall and at least a part of the core as an integral component, by a powder material using an additive manufacturing process; and
providing a coolant channel with curved sections that passes through the core.

13. The method according to claim 12, wherein the outer chip space wall is formed by a powder material by selective laser melting.

14. A machining tool for use in machine tools for rotating cutting operations, comprising:
a main body extending in the direction of a center axis and rotatable about the center axis;
a cutting element fastened to the main body;
a chip removal channel extending along the main body outside of the center axis and bounded inwardly by a core of the main body through which the center axis passes;
an outer chip space wall adjoining the core and closing a longitudinal section of the chip removal channel, wherein the outer chip space wall and at least part of the core are formed as an integral additive manufacturing component whereby the outer chip space wall and the at least part of the core are a single homogenous piece of material;
a coolant channel passing through the core and having curved sections;
wherein the main body has a front end-wall that covers a cross-sectional region of the chip removal channel; and
wherein the cutting element has an end cutting-edge which projects beyond the end wall.

15. Machining tool according to claim 14 wherein the end cutting edge projects beyond the end wall by 0.1 to 0.8 mm.

16. A machining tool for use in machine tools for rotating cutting operations, comprising:
a main body extending in the direction of a center axis and rotatable about the center axis;
a cutting element fastened to the main body;
a chip removal channel extending along the main body outside of the center axis and bounded inwardly by a core of the main body through which the center axis passes;
an outer chip space wall adjoining the core and closing a longitudinal section of the chip removal channel, wherein the outer chip space wall and at least part of the core are formed as an integral additive manufacturing component whereby the outer chip space wall and the at least part of the core are a single homogenous piece of material;
a coolant channel passing through the core and having curved sections;
wherein the main body has a front end-wall that covers a cross-sectional region of the chip removal channel; and
wherein the cutting element has a radially outwardly pointing radial cutting edge or cylindrical grinding bevel and an open radial gap is positioned between the outer chip space wall and the cutting element.

17. A machining tool for use in machine tools for rotating cutting operations, comprising:
a main body extending in the direction of a center axis and rotatable about the center axis;
a cutting element fastened to the main body;
a chip removal channel extending along the main body outside of the center axis and bounded inwardly by a core of the main body through which the center axis passes;
an outer chip space wall adjoining the core and closing a longitudinal section of the chip removal channel, wherein the outer chip space wall and at least part of the core are formed as an integral additive manufacturing component whereby the outer chip space wall and the at least part of the core are a single homogenous piece of material;
a coolant channel passing through the core and having curved sections; and
wherein the outer chip space wall comprises a radially outwardly protruding wall projection upstream of the cutting element in the rotational direction of the tool.

18. A machining tool for use in machine tools for rotating cutting operations, comprising:
a main body extending in the direction of a center axis and rotatable about the center axis;
a cutting element fastened to the main body;
a chip removal channel extending along the main body outside of the center axis and bounded inwardly by a core of the main body through which the center axis passes;
an outer chip space wall adjoining the core and closing a longitudinal section of the chip removal channel, wherein the outer chip space wall and at least part of the core are formed as an integral additive manufacturing component whereby the outer chip space wall and the at least part of the core are a single homogenous piece of material;

a coolant channel passing through the core and having curved sections; and wherein the coolant channel extends in an arcuate path to an outlet opening that opens into the chip removal channel and is oriented in the chip removal direction.

19. A machining tool for use in machine tools for rotating cutting operations, comprising:

a main body extending in the direction of a center axis and rotatable about the center axis;

a cutting element fastened to the main body;

a chip removal channel extending along the main body outside of the center axis and bounded inwardly by a core of the main body through which the center axis passes;

an outer chip space wall adjoining the core and closing a longitudinal section of the chip removal channel, wherein the outer chip space wall and at least part of the core are formed as an integral additive manufacturing component whereby the outer chip space wall and the at least part of the core are a single homogenous piece of material;

a coolant channel passing through the core and having curved sections; and wherein the cutting element is obliquely inclined at a shaft angle with respect to the center axis.

20. A machining tool for use in machine tools for rotating cutting operations, comprising:

a main body extending in the direction of a center axis and rotatable about the center axis;

a cutting element fastened to the main body;

a chip removal channel extending along the main body outside of the center axis and bounded inwardly by a core of the main body through which the center axis passes;

an outer chip space wall adjoining the core and closing a longitudinal section of the chip removal channel, wherein the outer chip space wall and at least part of the core are formed as an integral additive manufacturing component whereby the outer chip space wall and the at least part of the core are a single homogenous piece of material;

a coolant channel passing through the core and having curved sections; and wherein the diameter of the main body is enlarged in a front end-portion.

* * * * *